(12) United States Patent
Li et al.

(10) Patent No.: US 12,203,464 B2
(45) Date of Patent: Jan. 21, 2025

(54) FREQUENCY-ADJUSTABLE WATER DRIPPING DEVICE

(71) Applicant: Shenzhen Xuanda Electronics Co., LTD, Guangdong (CN)

(72) Inventors: Guodong Li, Guangdong (CN); Lei Gao, Guangdong (CN); Xiaowei Qi, Guangdong (CN); Jun Fan, Guangdong (CN); Xuanping Liu, Guangdong (CN)

(73) Assignee: Shenzhen Xuanda Electronics Co., LTD, Shenzhen (CN)

( * ) Notice: Subject to any disclaimer, the term of this patent is extended or adjusted under 35 U.S.C. 154(b) by 0 days.

(21) Appl. No.: 18/038,720

(22) PCT Filed: Dec. 13, 2022

(86) PCT No.: PCT/CN2022/138733
§ 371 (c)(1),
(2) Date: May 25, 2023

(87) PCT Pub. No.: WO2023/134372
PCT Pub. Date: Jul. 20, 2023

(65) Prior Publication Data
US 2024/0278274 A1    Aug. 22, 2024

(30) Foreign Application Priority Data

Jan. 12, 2022 (CN) .......................... 202220066630.9

(51) Int. Cl.
*F04B 43/04* (2006.01)
*B05B 1/02* (2006.01)
(Continued)

(52) U.S. Cl.
CPC ................ *F04B 43/04* (2013.01); *B05B 1/02* (2013.01); *B05B 1/083* (2013.01); *B05B 1/12* (2013.01); *B05B 9/0413* (2013.01); *B05B 12/082* (2013.01)

(58) Field of Classification Search
CPC ......... F04B 43/043; B05B 1/02; B05B 1/083; B05B 1/12; B05B 9/0413; B05B 12/082
See application file for complete search history.

(56) References Cited

U.S. PATENT DOCUMENTS 6,129,527 A * 10/2000 Donahoe ............... F04B 35/045
417/418
2003/0180164 A1 9/2003 Bunner et al.
(Continued)

FOREIGN PATENT DOCUMENTS

| CN | 102395790 A | 3/2012 |
| CN | 114544211 A | 5/2022 |

*Primary Examiner* — Bryan M Lettman

(57) ABSTRACT

A frequency-adjustable water dripping device. The water dripping device includes a U-shaped magnetic conductive cup, a printed circuit board (PCB), a magnetic field generating device, a water containing cavity, and a water outlet, where the U-shaped magnetic conductive cup is connected to the magnetic field generating device, and the magnetic field generating device is connected to the PCB. When alternating current signals with different frequencies are input into the PCB and sent to the magnetic field generating device, a volume of the water containing cavity is changed by means of a magnetic field generated by the magnetic field generating device, such that different water dripping effects are generated. According to the frequency-adjustable water dripping device, the volume of the water containing cavity is changed by means of the generated magnetic field, such that different water dripping effects are generated.

8 Claims, 3 Drawing Sheets

(51) Int. Cl.
_B05B 1/08_ (2006.01)
_B05B 1/12_ (2006.01)
_B05B 9/04_ (2006.01)
_B05B 12/08_ (2006.01)

(56) References Cited

U.S. PATENT DOCUMENTS

2016/0222950 A1* 8/2016 Kawamori .............. F04B 23/02
2018/0209408 A1* 7/2018 Moon ................. F04B 39/0027

* cited by examiner

FREQUENCY-ADJUSTABLE WATER DRIPPING DEVICE

TECHNICAL FIELD

The present disclosure relates to the technical field of water dripping devices, and in particular to a frequency-adjustable water dripping device.

BACKGROUND

A water dripping device is mainly used in property tests of products during storage, transportation and use under a climatic environment of being exposed to rain. The device is mainly used for testing physical and other related properties of products such as electrical and electronic products, lamps, electrical cabinets, electrical apparatus elements, automobiles, motorcycles and parts thereof under a climatic condition of simulating the state of being exposed to the rain, and after testing, whether the properties of the products can satisfy the requirements or not is determined through verification, such that design, improvement, verification and factory inspection for use of the products are facilitated.

In the prior art, a frequency of the water dripping device fails to be adjusted, and water drops cannot drip down according to a fixed frequency.

SUMMARY

An objective of the present disclosure is to provide a frequency-adjustable water dripping device so as to solve the problem that the frequency fails to be adjusted mentioned in the background.

In order to achieve the above objective, the present disclosure provides the technical solution as follows: a frequency-adjustable water dripping device includes a U-shaped magnetic conductive cup, a printed circuit board (PCB), a magnetic field generating device, a water containing cavity, and a water outlet.

The U-shaped magnetic conductive cup is connected to the magnetic field generating device, the magnetic field generating device is connected to the PCB, the water containing cavity is provided in a front end of the magnetic field generating device, and the water outlet is provided in a front end of the water containing cavity.

When alternating current signals with different frequencies are input into the PCB, and are sent to the magnetic field generating device, a volume of the water containing cavity is changed by means of a magnetic field generated by the magnetic field generating device, such that different water dripping effects are generated.

Further, the U-shaped magnetic conductive cup includes a magnet and a magnetic conductive sheet, where a bottom layer of the U-shaped magnetic conductive cup is provided with the magnet, and a surface of the magnet is covered with the magnetic conductive sheet. An inner diameter of the U-shaped magnetic conductive cup is greater than an outer diameter of the magnet to form a groove, and an outer wall of the U-shaped magnetic conductive cup is bonded to a hollow position of a support.

Further, the support includes a supporting frame and a side ring, where the side ring is fixed to a lower end of the support by means of the supporting frame, a PCB mounting layer is arranged on one side of a top surface of the supporting frame, and the PCB is mounted on the PCB mounting layer.

Further, one side of the side ring is provided with a wire outlet for a wire to be in and out.

Further, the magnetic field generating device includes a coil positioning sheet, an elastic sheet, a coil and a wire, where a side end of the coil positioning sheet is provided with a step, and the step is provided with the elastic sheet in a sleeved manner. The step is further provided with the coil in a sleeved manner, the coil is pressed at an upper end of the elastic sheet, and the wire of the coil penetrates out of the wire outlet to be connected to the PCB.

Further, the elastic sheet is hollow inside, and a plurality of zigzag through holes are provided in the circumference of the elastic sheet.

Further, an outer end of the coil positioning sheet is bonded at the hollow position of the support, and the coil is in butt joint with the groove of the U-shaped magnetic conductive cup.

Further, the water containing cavity includes a vibrating diaphragm and a water output lower cover, where one side of the vibrating diaphragm is inserted into a lower end of the support, and the other surface of the vibrating diaphragm and a flow guide groove are mounted together.

The water output lower cover is funnel-shaped, a lower end of the water output lower cover is provided with the water outlet, an upper end of the water output lower cover is provided with a circular boss, and four ends of the boss extend out to form four mounting lugs.

A mounting groove and the flow guide groove are provided inside the boss, and the mounting groove is higher than the flow guide groove.

The mounting groove is configured to be mounted with the support together, one side of the flow guide groove is connected to a water inlet, and one end of the water inlet is connected to an external pipeline.

Further, a variable cavity is formed between the vibrating diaphragm and an inner space of the flow guide groove, and a circle of protrusion is wound around an outer circumference of the vibrating diaphragm.

Compared with the prior art, the present disclosure has the beneficial effects as follows: the frequency-adjustable water dripping device sends the different alternating current signals by means of the PCB, and the volume of the water containing cavity is changed by means of the generated magnetic field, such that different water dripping effects are generated.

in the figures: 1—U-shaped magnetic conductive cup, 2—printed circuit board (PCB), 3—magnetic field generating device, 31—coil positioning sheet, 32—elastic sheet, 33—coil, 34—wire, 4—water containing cavity, 41—vibrating diaphragm, 42—water output lower cover, 43—boss, 44—mounting groove; 45—flow guide groove, 5—water outlet, 61—supporting frame, 62—side ring, 63—PCB mounting layer, 6—support, 7—water inlet, 11—magnet, 12—magnetic conductive sheet, and 13—groove.

DETAILED DESCRIPTION OF THE EMBODIMENTS

The technical solutions in the examples of the present disclosure will be clearly and completely described below with reference to the accompanying drawings in the examples of the present disclosure. Obviously, the described examples are merely some examples rather than all examples of the present disclosure. All the other examples obtained by those of ordinary skill in the art based on the examples in the present disclosure without creative efforts shall fall within the scope of protection of the present disclosure.

Figure 1:
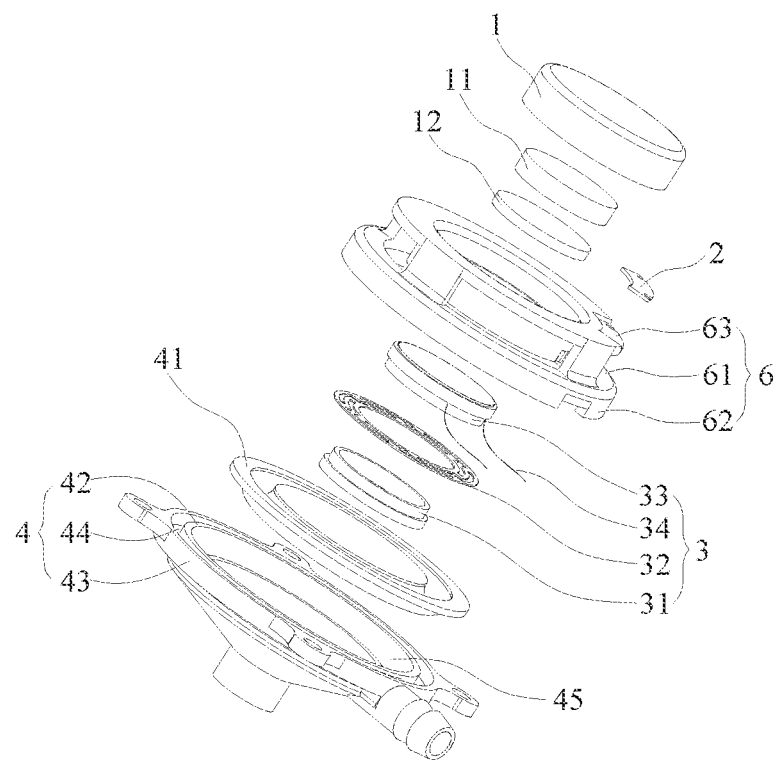
FIG. 1 is a schematic structural diagram of a frequency-adjustable water dripping device of the present disclosure.
Figure 2:
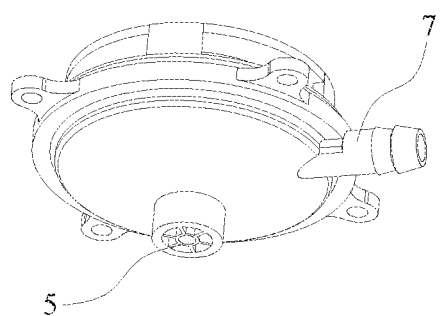
FIG. 2 is a schematic structural diagram of an example of a frequency-adjustable water dripping device of the present disclosure.
Figure 3:
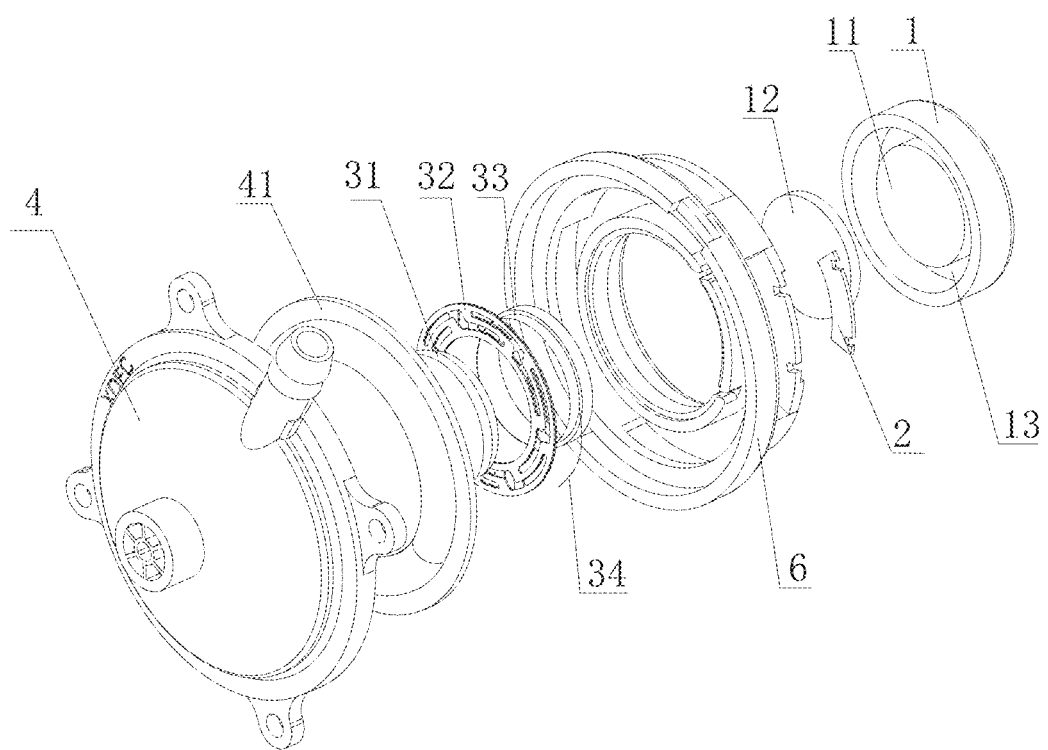
FIG. 3 is a schematic structural diagram of another example of a frequency-adjustable water dripping device of the present disclosure.

As shown in FIG. 1, FIG. 2 and FIG. 3, the present disclosure provides a technical solution as follows: a frequency-adjustable water dripping device includes a U-shaped magnetic conductive cup 1, a printed circuit board (PCB) 2, a magnetic field generating device 3, a water containing cavity 4, and a water outlet 5.

The U-shaped magnetic conductive cup 1 is connected to the magnetic field generating device 3, the magnetic field generating device 3 is connected to the PCB 2, the water containing cavity 4 is provided in a front end of the magnetic field generating device 3, and the water outlet 5 is provided in a front end of the water containing cavity 4.

When alternating current signals with different frequencies are input into the PCB 2, and are sent to the magnetic field generating device 3, a volume of the water containing cavity is changed by means of a magnetic field generated by the magnetic field generating device 3, such that different water dripping effects are generated.

The U-shaped magnetic conductive cup 1 includes a magnet 11 and a magnetic conductive sheet 12, where a bottom layer of the U-shaped magnetic conductive cup 1 is provided with the magnet 11, and a surface of the magnet 11 is covered with the magnetic conductive sheet 12. An inner diameter of the U-shaped magnetic conductive cup 1 is greater than an outer diameter of the magnet 11 to form a groove 13, and an outer wall of the U-shaped magnetic conductive cup 1 is bonded to a hollow position of a support 6.

The support 6 includes a supporting frame 61 and a side ring 62, where the side ring 62 is fixed to a lower end of the support 6 by means of the supporting frame 61, a PCB mounting layer 63 is arranged on one side of a top surface of the supporting frame 61, and the PCB 2 is mounted on the PCB mounting layer 63.

One side of the side ring 62 is provided with a wire outlet for a wire to be in and out.

The magnetic field generating device 3 includes a coil positioning sheet 31, an elastic sheet 32, a coil 33 and a wire 34, where a side end of the coil positioning sheet 31 is provided with a step, and the step is provided with the elastic sheet 32 in a sleeved manner. The step is further provided with the coil 33 in a sleeved manner, the coil 33 is pressed at an upper end of the elastic sheet 32, and the wire of the coil 33 penetrates out of the wire outlet to be connected to the PCB 2.

The elastic sheet 32 is hollow inside, and a plurality of zigzag through holes are provided in the circumference of the elastic sheet 32.

An outer end of the coil positioning sheet 31 is bonded at the hollow position of the support 6, and the coil 33 is in butt joint with the groove of the U-shaped magnetic conductive cup 1.

The water containing cavity 4 includes a vibrating diaphragm 41 and a water output lower cover 42, where one side of the vibrating diaphragm 41 is inserted into a lower end of the support 6, and the other surface of the vibrating diaphragm 41 and a flow guide groove are mounted together.

The water output lower cover 42 is funnel-shaped, a lower end of the water output lower cover 42 is provided with the water outlet 5, an upper end of the water output lower cover 42 is provided with a circular boss 43, and four ends of the boss 43 extend out to form four mounting lugs.

A mounting groove 44 and the flow guide groove 45 are provided inside the boss 43, and the mounting groove 44 is higher than the flow guide groove 45.

The mounting groove 44 is configured to be mounted with the support 6 together, one side of the flow guide groove 45 is connected to a water inlet 7, and one end of the water inlet 7 is connected to an external pipeline.

A water output inner cavity is formed between the vibrating diaphragm 41 and an inner space of the flow guide groove, and a circle of protrusion is wound around an outer circumference of the vibrating diaphragm 41.

Working Principle:

(1) The volume of the water containing cavity is changed by inputting the alternating current signals with different frequencies to the PCB to enable the device to work under a certain frequency condition; and (2) when the alternating current signals with a certain frequency are input to the coil, the coil may produce an alternating magnetic field which may form fixed magnetism to generate acting force together with U iron, the magnet and the magnetic conductive sheet so as to push the vibrating diaphragm for pressing to change the volume of the water containing cavity, thereby generating a frequency-adjustable water dripping effect.

Example 2: a frequency-adjustable water dripping device includes a rack, a frequency receiving device configured to receive alternating current signals of different frequencies, a high magnetic device for forming magnetic density lines, and a water containing cavity 4 for water dripping, where the frequency receiving device is electrically connected to the high magnetic device, the high magnetic device is placed perpendicular to the water containing cavity 4, and the high magnetic device and the water containing cavity are fixed together by means of the rack.

The alternating current signals received by the frequency receiving device are sent to the high magnetic device, and a water output frequency of the water containing cavity is changed by means of an alternating magnetic field generated by the high magnetic device.

In an example, the frequency receiving device is of a PCB 2.

The high magnetic device includes a U-shaped magnetic conductive cup 1 and a magnetic field generating device 3, where the U-shaped magnetic conductive cup and the magnetic field generating device are fixed together. When an alternating current signal with a certain frequency is input, the magnetic field generating device generates an alternating magnetic field, and the alternating magnetic field and the U-shaped magnetic conductive cup form fixed magnetism to generate acting force so as to push a vibrating diaphragm for pressing to change the volume of the water containing cavity.

The water containing cavity includes a water inlet for introducing water into the water containing cavity, a water output inner cavity and the vibrating diaphragm, where the water inlet is in communication with the water output inner cavity, the vibrating diaphragm 41 is arranged on an upper layer of the water output inner cavity, and water enters the water inlet, and then is discharged from the water output inner cavity under pressing of the vibrating diaphragm 41.

The rack includes a water output lower cover 42 and a support 6, and the water output lower cover 42 and the support 6 are fixed together by means of a mounting groove 44.

The U-shaped magnetic conductive cup 1 includes a magnet 11 and a magnetic conductive sheet 12, where a bottom layer of the U-shaped magnetic conductive cup 1 is provided with the magnet 11, and a surface of the magnet 11 is covered with the magnetic conductive sheet 12. An inner diameter of the U-shaped magnetic conductive cup 1 is greater than an outer diameter of the magnet 11 to form a groove 13, and an outer wall of the U-shaped magnetic conductive cup 1 is bonded to a hollow position of the support 6.

The magnetic field generating device 3 includes a coil positioning sheet 31, an elastic sheet 32, a coil 33 and a wire 34, where a side end of the coil positioning sheet 31 is provided with a step, and the step is provided with the elastic sheet 32 in a sleeved manner. The step is further provided with the coil 33 in a sleeved manner, the coil 33 is pressed at an upper end of the elastic sheet 32, and the wire 34 of the coil 33 penetrates out of a wire outlet to be connected to the PCB 2.

The elastic sheet 32 is hollow inside, and a plurality of zigzag through holes are provided in the circumference of the elastic sheet 32.

An outer end of the coil positioning sheet 31 is bonded at the hollow position of the support 6, and the coil 33 is in butt joint with the groove 13 of the U-shaped magnetic conductive cup 1.

The support 6 includes a supporting frame 61 and a side ring 62, where the side ring 62 is fixed to a lower end of the support 6 by means of the supporting frame 61, a PCB mounting layer 63 is arranged on one side of a top surface of the supporting frame 61, and the PCB 2 is mounted on the PCB mounting layer 63. One side of the side ring 62 is provided with the wire outlet for the wire 34 to be in and out.

The water containing cavity 4 further includes a water output lower cover 42, where one side of the vibrating diaphragm 41 is inserted into a lower end of the support 6, and the other surface of the vibrating diaphragm 41 and a flow guide groove 45 are mounted together.

The water output lower cover 42 is funnel-shaped, a lower end of the water output lower cover 42 is provided with the water outlet 5, an upper end of the water output lower cover 42 is provided with a circular boss 43, and four ends of the boss 43 extend out to form four mounting lugs.

A mounting groove 44 and the flow guide groove 45 are provided inside the boss 43, and the mounting groove 44 is higher than the flow guide groove 45.

The mounting groove 44 is configured to be mounted with the support 6 together, one side of the flow guide groove 45 is connected to a water inlet, and one end of the water inlet is connected to an external pipeline.

The water output inner cavity is formed between the vibrating diaphragm 41 and an inner space of the flow guide groove 45, and a circle of protrusion is wound around an outer circumference of the vibrating diaphragm 41.

Example 3

On the basis of example 1 or example 2 mentioned above, the present disclosure provides another technical solution:

In one example, the coil positioning sheet is made of acrylonitrile-butadiene-styrene (ABS), the vibrating diaphragm is made of rubber, the protrusion is supported by means of an iron ring, and the elastic sheet is made of 304 stainless steel.

ABS resin is one of five main kinds of synthetic resin, and due to being hard, the ABS material has strong impact resistance, scratch resistance, size stability and other properties, also has the characteristics of being moisture proof, corrosion resistant, easy to process, etc., and is an ideal material for a plate industry.

In another example, a polyethylene terephthalate (PET) diaphragm is used instead.

The PET material, commonly known as polyester resin, is the most important variety of thermoplastic polyester, has a physical property of milky white or light yellow highly crystalline polymer, has a smooth and shiny surface, endchange resistance, fatigue resistance, friction resistance, small wear and high hardness, and has the largest toughness in thermoplastic plastics.

The process is simplified by changing the diaphragm to be made of the PET, which makes mass production easier.

Example 4: a frequency-adjustable water dripping device includes a rack, a frequency receiving device configured to receive alternating current signals of different frequencies, a high magnetic device for forming magnetic density lines, and a water containing cavity 4 for water dripping, where the frequency receiving device is electrically connected to the high magnetic device, the high magnetic device is placed perpendicular to the water containing cavity 4, and the high magnetic device and the water containing cavity are fixed together by means of the rack.

The alternating current signals received by the frequency receiving device are sent to the high magnetic device, and a water output frequency of the water containing cavity is changed by means of an alternating magnetic field generated by the high magnetic device.

The high magnetic device includes a U-shaped magnetic conductive cup 1 and a magnetic field generating device 3, where the U-shaped magnetic conductive cup and the magnetic field generating device are fixed together. When an alternating current signal with a certain frequency is input, the magnetic field generating device generates an alternating magnetic field, and the alternating magnetic field and the U-shaped magnetic conductive cup form fixed magnetism to generate acting force so as to push a vibrating diaphragm for pressing to change the volume of the water containing cavity.

The water containing cavity includes a water inlet for introducing water into the water containing cavity, a water output inner cavity and the vibrating diaphragm, where the water inlet is in communication with the water output inner cavity, the vibrating diaphragm 41 is arranged on an upper layer of the water output inner cavity, and water enters the water inlet, and then is discharged from the water output inner cavity under pressing of the vibrating diaphragm 41.

Example 5

On the basis of any one of examples 1-4, the water outlet of the present disclosure is connected to an infusion pipeline, and the water inlet at the other end is connected to an infusion bottle, such that different frequencies may be input to the frequency receiving device to control inflow time of the liquid input into a human body, and the flowing speed of each drop of liquid is adjustable by means of the frequency receiving device.

Example 6

The PCB is provided with a frequency conversion circuit.

Example 7

A spoke plate is fixed on an inner wall of the water outlet 5, the spoke plate and a hollow cylinder are fixed together, and water drops flow out of the hollow cylinder.

Example 8

A front end of the water inlet 7 is of a conical through pipeline, a rear end of the conical pipeline is provided with a spaced empty groove for connecting to an external pipeline, and a tail end of the water inlet 7 is connected to the flow guide groove 45 in a penetrating manner.

Example 9

On the basis of examples 1-9, the liquid dripping device of the present disclosure is mounted at an upper end of an anti-gravity water dripping device.

The anti-gravity water dripping device includes a main body, glass, and an operating device.

The liquid dripping device is arranged at an upper end of an interior of the main body, a stroboscopic light-emitting diode (LED) lamp emitting a light source downwards is arranged at a water outlet of the liquid dripping device, the stroboscopic LED lamp controls a stroboscopic frequency by means of a control circuit board, and the control circuit board is further electrically connected to the water dripping device.

A middle of the main body is of a hollow structure, and a housing structure of the middle is made of a transparent material and is configured to be made of plastic or glass.

A lower end of the main body is provided with a water tank for water circulation and a water pump, the water tank is fixed at the lower end, the water tank is configured to receive water drops falling from an upper end of the main body, and the water pump is connected to a water inlet of the water dripping device by means of a pipeline.

Four ends of a boss 43 of the liquid dripping device extend out to form four mounting lugs, and the mounting ears are fixed to the main body by means of bolts.

Example 10

A plurality of groups of water dripping devices are arranged side by side in a plane, the stroboscopic lamps are flush with the water outlets of the water dripping devices, the light sources point to the water dripping positions, and different water dripping patterns may be generated according to the stroboscopic frequency.

Example 11

For testing of inspection conditions of the water dripping device of the present disclosure, see tables 1 and 2 for reliability condition verification of products. Testing purpose: life test, testing experiment, and structural verification.

Testing conditions:
Heat resistance test: temperature: 80° C., humidity 20-25% RH; time: 96 H;
cold resistance test: temperature: −40° C., humidity/° % RH; time: 96 H; and
humidity resistance test: temperature: 40° C., humidity 90-95° % RH; time: 96 H.

An input voltage of 0.75 V is provided for the frequency receiving device, and testing time is 384 hours.

Inspection before testing: 1. Material No. determination, 2. External dimensions, 3. Value of resistance, 4. Audition, 5. Others:

TABLE 1

| Time and serial number | 12.8 | | 12.9 | | 12.10 | | 12.11 |
|---|---|---|---|---|---|---|---|
| 1 | 10:00 | 17:00 | 8:00 | 18:00 | 8:00 | 18:00 | 9:00 |
| 2 | OK | OK | OK | OK | OK | OK | OK |
| 3 | OK | OK | OK | OK | OK | OK | OK |
| 4 | OK | OK | OK | OK | OK | OK | OK |
| 5 | OK | OK | OK | OK | OK | OK | OK |
| 6 | OK | OK | OK | OK | OK | OK | OK |
| 7 | OK | OK | OK | OK | OK | OK | OK |

TABLE 2

| Time Serial number | 12.12 | | 12.13 | | 12.14 | | |
|---|---|---|---|---|---|---|---|
| 1 | 15:00 | 9:00 | 18:00 | 8:00 | 8:00 | 8:00 | 18:00 |
| 2 | OK | OK | OK | OK | OK | OK | OK |
| 3 | OK | OK | OK | OK | OK | OK | OK |
| 4 | OK | OK | OK | OK | OK | OK | OK |
| 5 | OK | OK | OK | OK | OK | OK | OK |
| 6 | OK | OK | OK | OK | OK | OK | OK |
| 7 | OK | OK | OK | OK | OK | OK | OK |

TABLE 3

| Time Serial number | 12.15 | | 12.16 | | 12.17 | | 12.18 |
|---|---|---|---|---|---|---|---|
| 1 | 9:00 | 17:00 | 8:00 | 18:00 | 8:00 | 18:00 | 8:00 |
| 2 | OK | OK | OK | OK | OK | OK | OK |
| 3 | OK | OK | OK | OK | OK | OK | OK |
| 4 | OK | OK | OK | OK | OK | OK | OK |
| 5 | OK | OK | OK | OK | OK | OK | OK |
| 6 | OK | OK | OK | OK | OK | OK | OK |
| 7 | OK | OK | OK | OK | OK | OK | OK |

TABLE 4

| Time Serial number | 12.19 | | |
|---|---|---|---|
| 1 | 18:00 | 8:00 | 15:00 |
| 2 | OK | OK | OK |
| 3 | OK | OK | OK |
| 4 | OK | OK | OK |
| 5 | OK | OK | OK |
| 6 | OK | OK | OK |
| 7 | OK | OK | OK |

For testing of inspection conditions of the water dripping device of the present disclosure, see table 5 for a neutral salt spray test:

Laboratory temperature: 35±1° C.; pressure barrel temperature: 47±1° C.; compressed air pressure: 1 kg/cm²; brine concentration: 5% Nacl; and salt aqueous solution PH: 6.8.

Inspection before testing: whether parameter setting is correct, whether spray of a laboratory is normal, whether sealing of the laboratory is normal, and whether exhausting of the laboratory is normal.

TABLE 5

| Model | Starting time | | Ending time | | Amount | Records of experimental results |
|---|---|---|---|---|---|---|
| Water dripping device | 12.15 | 9.00 | 12.18 | 9.00 | 1 pc | Salt spray test showing no abnormal oxidation for 72 H |
| Water dripping device | 12.15 | 9.00 | 12.18 | 9.00 | 1 pc | Salt spray test showing no abnormal oxidation for 72 H |
| Water dripping device | 12.15 | 9.00 | 12.18 | 9.00 | 1 pc | Salt spray test showing no abnormal oxidation for 72 H |
| Water dripping device | 12.15 | 9.00 | 12.18 | 9.00 | 1 pc | Salt spray test showing no abnormal oxidation for 72 H |
| Water dripping device | 12.15 | 9.00 | 12.18 | 9.00 | 1 pc | Salt spray test showing no abnormal oxidation for 72 H |
| Water dripping device | 12.15 | 9.00 | 12.18 | 9.00 | 1 pc | Salt spray test showing no abnormal oxidation for 72 H |

For testing of inspection conditions of the water dripping device of the present disclosure, a waterproof condition is verified: IPX8 (continuous diving test) is continuously tested for 96 hours without abnormality.

Although the present disclosure is described in detail with reference to the aforementioned examples, those skilled in the art may still make modifications to the technical solutions recorded in the aforementioned examples and equivalent substitutions of some technical features of the technical solutions, and any modifications, equivalent substitutions, improvements, etc. made within the spirit and principles of the present disclosure should fall within the protection scope of the present disclosure.

The invention claimed is:

1. A frequency-adjustable water dripping device, comprising a U-shaped magnetically conductive cup, a printed circuit board (PCB), a magnetic field generating device, a water containing cavity, and a water outlet, wherein
the U-shaped magnetically conductive cup is connected to the magnetic field generating device, the magnetic field generating device is connected to the PCB, the water containing cavity is provided in a front end of the magnetic field generating device, and the water outlet is provided in a front end of the water containing cavity; and
when alternating current signals with different frequencies are input into the PCB, and are sent to the magnetic field generating device, a volume of the water containing cavity is changed by means of a magnetic field generated by the magnetic field generating device, such that different water dripping effects are generated,
wherein the water containing cavity comprises a vibrating diaphragm and a water output lower cover, one side of the vibrating diaphragm is inserted into a lower end of the support, and the other surface of the vibrating diaphragm and a flow guide groove are mounted together;
the water output lower cover is funnel-shaped, a lower end of the water output lower cover is provided with the water outlet, an upper end of the water output lower cover is provided with a circular boss having four protrusions that extend radially outward to form four mounting lugs; and
a mounting groove and the flow guide groove are provided inside the boss, the mounting groove is higher than the flow guide groove, the mounting groove is configured to be mounted with the support together, one side of the flow guide groove is connected to a water inlet, and one end of the water inlet is connected to an external pipeline.

2. The frequency-adjustable water dripping device according to claim 1, wherein the U-shaped magnetically conductive cup comprises a magnet and a magnetically conductive sheet, a bottom layer of the U-shaped magnetically conductive cup is provided with the magnet, and a surface of the magnet is covered with the magnetic conductive sheet; an inner diameter of the U-shaped magnetically conductive cup is greater than an outer diameter of the magnet to form a groove; and an outer wall of the U-shaped magnetically conductive cup is bonded to a hollow position of a support.

3. The frequency-adjustable water dripping device according to claim 2, wherein the support comprises a supporting frame and a side ring, the side ring is fixed to a lower end of the supporting frame, a PCB mounting layer is arranged on one side of a top surface of the supporting frame, and the PCB is mounted on the PCB mounting layer.

4. The frequency-adjustable water dripping device according to claim 3, wherein one side of the side ring is provided with a wire outlet for a wire to be in and out.

5. The frequency-adjustable water dripping device according to claim 1, wherein the magnetic field generating device comprises a coil positioning sheet, an elastic sheet, a coil and a wire, a side end of the coil positioning sheet is provided with a step, the step is provided with the elastic sheet in a sleeved manner, the step is further provided with the coil in a sleeved manner, the coil is attached at an upper end of the elastic sheet, and the wire of the coil penetrates out of a wire outlet to be connected to the PCB.

6. The frequency-adjustable water dripping device according to claim 5, wherein the elastic sheet is hollow inside, and a plurality of zigzag through holes are provided in the circumference of the elastic sheet.

7. The frequency-adjustable water dripping device according to claim 5, wherein an outer end of the coil positioning sheet is bonded at the hollow position of the support, and the coil is in contact with the groove of the U-shaped magnetically conductive cup.

8. The frequency-adjustable water dripping device according to claim 1, wherein a variable cavity is formed between the vibrating diaphragm and an inner space of the flow guide groove, and a circular protrusion surrounds an outer circumference of the vibrating diaphragm.

* * * * *